United States Patent
Su et al.

(10) Patent No.: US 8,521,947 B2
(45) Date of Patent: Aug. 27, 2013

(54) METHOD FOR WRITING DATA INTO FLASH MEMORY

(75) Inventors: Tso-Cheng Su, Taiei (TW); Shih-Fang Hung, Yonghe (TW); Tzu-Wei Fang, Jhonghe (TW)

(73) Assignee: A-Data Technology Co., Ltd., Taipei (TW)

( * ) Notice: Subject to any disclaimer, the term of this patent is extended or adjusted under 35 U.S.C. 154(b) by 549 days.

(21) Appl. No.: 12/562,294

(22) Filed: Sep. 18, 2009

(65) Prior Publication Data

US 2010/0287330 A1   Nov. 11, 2010

(30) Foreign Application Priority Data

May 6, 2009   (TW) ................................ 98114976 A

(51) Int. Cl.
*G06F 12/00*   (2006.01)

(52) U.S. Cl.
USPC .... 711/103; 711/154; 711/171; 711/E12.001; 711/E12.008; 711/E12.009; 365/185.33

(58) Field of Classification Search
USPC .......... 711/103, 154, 171, E12.001, E12.008, 711/E12.009; 365/185.33
See application file for complete search history.

(56) References Cited

U.S. PATENT DOCUMENTS

2009/0100244 A1*  4/2009  Chang et al. ................... 711/172
2010/0011154 A1*  1/2010  Yeh ............................... 711/103

* cited by examiner

*Primary Examiner* — Jasmine Song
(74) *Attorney, Agent, or Firm* — Houtteman Law LLC

(57) ABSTRACT

Method for writing data into flash memory is disclosed. The method includes storing the frequently updated data and the not-aligned data collectively into some of the physical memory blocks of the flash memory. In other words, the method collectively writes those data into the same physical memory blocks of the flash memory as far as possible. By doing this, the invalid physical memory pages in the physical memory blocks can be generated collectively. As a result, the storage releasing efficiency of garbage collection can be greatly improved.

7 Claims, 12 Drawing Sheets

|      | PBA0    | PBA1  | PBA2    | PBA3    |
|------|---------|-------|---------|---------|
| PPA0 | D00(X)  | D00'  | D20     | D30     |
| PPA1 | D01     | D22'  | D21     | D31     |
| PPA2 | D02     | D33'  | D22(X)  | D32     |
| PPA3 | D03     | D34'  | D23     | D33(X)  |
| PPA4 | D04     | free  | D24     | D34(X)  |
| ⋮    | ⋮       | ⋮     | ⋮       | ⋮       |
| PPAn | D0n     | free  | D2n     | D3n     |

METHOD FOR WRITING DATA INTO FLASH MEMORY

CROSS-REFERENCE TO RELATED APPLICATION

This application claims priority under 35 U.S.C. §119 to Taiwan Patent Application No. 098114976, filed on May 6, 2009, in the Taiwan Intellectual Property Office, the entire contents of which are hereby incorporated by reference.

BACKGROUND OF THE INVENTION

1. Field of the Invention

The present invention relates to a method for writing data, especially to a method for writing data into flash memory in order to improve the efficiency of operating and storage using.

2. Description of the Related Art

Flash memory is a kind of non-volatile memory. Because of low power consumption, high accessing rate, anti-shock, and light weight properties, the flash memory is widely used in computer systems and portable devices as data storage.

A common framework of flash memory storage system is as shown in FIG. 1. A flash memory 5 includes a control unit 51 and a memory unit 53. The flash memory 5 uses the control unit 51 for processing the sets of data and instructions transmitted from a host 4. After the control unit 51 receives the instructions from the host 4 and converts logical addresses to physical addresses, the memory unit 53 is then involved for data storing or reading.

Please refer to FIG. 2, the memory unit 53 is divided into several physical memory blocks (labeled PBA0 to PBAm in this embodiment, total amount: m+1). In which the physical memory block is the minimum erasable unit of the memory unit 53. In addition, every physical memory block has a plurality of physical memory pages (labeled PPA0 to PPAn in this embodiment, total amount: n+1), and the physical memory page is the minimum writable unit of the memory unit 53.

After the control unit 51 receives the instructions and the set of target data from the host 4 and converts the target logical addresses into physical addresses, an erased physical memory block in the memory unit 53 is selected (PBA0 in this example). Then, the set of target data is written into the physical memory pages of the erased physical memory block in the numerical order (PPA0, PPA1, PPA2 . . . ).

Conventional data updating process is as shown in FIG. 3. First, the control unit 51 receives a first instruction which stands for updating data. In which the first instruction indicates that the data D00 in the physical memory page PP0 of the physical memory block PBA0 in the memory unit 53 is the data to be updated. Next, the control unit 51 selects an erased physical memory block PB1 for storing the updating data D00' transmitted from the host 4. And the control unit 51 then stores the updating data D00' in the physical memory block PBA1 starting from the beginning of the physical memory block PBA1, that is, the physical memory page PPA0 of the physical memory block PBA1. Finally, the control unit 51 marks the data D00 in the physical memory page PPA0 of the physical memory block PBA0 as invalid data.

Then, the control unit 51 receives a second data updating instruction. In which, the second instruction indicates that the data D22 in the physical memory page PPA2 of the physical memory block PBA2 is the data to be updated. Since the physical memory block PBA1 is currently used to write new data, so the control unit 51 stores the updating data D22' transmitted from the host 4 successively into the physical memory page PPA1 of the physical memory block PBA1. And the data D22 in the physical memory block PBA2 is then marked as invalid data.

Next, the control unit 51 receives a third data updating instruction again. Similarly, the updating data D33' is successively stored into the physical memory page PPA2 of the currently-used physical memory block PBA1. And the data D33 stored in the physical memory page PPA3 of the physical memory block PBA3 is then marked as invalid data. The fourth data updating instruction makes the control unit 51 to store the updating data D34' into the physical memory page PPA3 of the physical memory block PBA1, and to mark the data D34 in the physical memory page PPA4 of the physical memory block PBA3 as invalid data.

As shown in FIG. 3, the number of the physical memory pages which are marked "invalid" increases due to the data updating processes. When the storage space of the memory unit 53 reduces to a predetermined value, a garbage collection process must be carried out in order to release the physical memory pages which are occupied by the invalid data.

Please refer to FIG. 4 corresponding with FIG. 3, for explaining the garbage collection process. At the beginning, the control unit 51 chooses the physical memory block (PBA3 in this embodiment) with the most invalid physical memory pages to do the garbage collection. Then, all of the valid data D30~D32 and D35~D3n in the chosen physical memory block PBA3 is copied to an erased physical memory block PBA4. Next, the physical memory block PBA3 is erased for writing new data. Therefore, by doing the garbage collection, two physical memory pages are released consequently in this embodiment.

As shown in FIG. 4, the more invalid physical memory pages in the chosen physical memory block, the more physical memory pages may be released after doing the garbage collection. In the embodiment, the physical memory block PBA3 has two physical memory pages PPA3 and PPA4. So after the garbage collection, only two physical memory pages are released. Therefore, if all of the physical memory blocks in the memory unit 53 have only a few invalid physical memory pages, the efficiency of garbage collection is lowered. Moreover, the difficulty of choosing which physical memory block to do the garbage collection is increased.

Besides the above problems, the address alignment problem of data being stored is another factor which causes the garbage collection to be inefficient. Because the set of target data transmitted from the host can't always be an integer multiple of the minimum writable unit (the storage size of one physical memory page) of the memory unit 53, so it must occur that some data is not aligned to the physical memory page.

Please refer to FIG. 5A, a set of data D1 which includes data D10, D11, and D12 is going to be stored into the memory unit 53. Wherein the data D10 and D11 each is the data which can fill one physical memory page to the full. On the contrary, the data D12 is the data which is smaller than the storage size of one physical memory page (not aligned). Thus, when the control unit 51 transmits the data D12 to the memory unit 53, the data D12 is stored into the physical memory page PPA2 along with a set of old data Dd2 (or a set of dummy data) which is used to fill the physical memory page PPA2 to the full. For example, if the physical memory page PPA2 is an erased memory page, the data bits represented in the physical memory page PPA2 are all 1. So the remaining storage bits of the physical memory page PPA2 are all filled with 1.

Next, please refer to FIG. 5B, the following stored data D2 which received by the control unit 51 includes data D20, D21, D22, and D23. If the data D2 is going to be stored successively right after the data D12, then the control unit 51 copies the data D12 and combines the data D12 together with the data D20, in which the combined data can exactly fill the storage size of a physical memory page. Next, the combined data is written into the physical memory page PPA3, and the physical memory page PPA2 is marked as an invalid physical memory page.

Similarly, as shown in FIG. 5B, the data D23 can't fill the physical memory page PPA6 to the full. Therefore, the remaining storage bits of the physical memory page PPA6 are filled with the old data Ddb.

According to the above discussion, we can know that invalid physical memory page will be generated if there is a set of data wishing to be stored successively right after the not-aligned data. And if the invalid physical memory pages locate dispersedly in the memory unit 51, the storage releasing efficiency of garbage collection is not desirable.

SUMMARY OF THE INVENTION

Because of the aforementioned problems, the present invention discloses methods for allocating the storing data. Through the disclosed methods, the invalid physical memory pages will be generated collectively in some of the memory blocks of the memory unit. Therefore, the storage releasing, efficiency of garbage collection can be improved.

For achieving the mentioned purposes, the present invention invites a method for writing data into a flash memory. The flash memory includes a control unit and a memory unit. In which, the memory unit is separated into several physical memory blocks which are the minimum erasable unit of the memory unit. The physical memory block is further separated into a plurality of physical memory pages which are the minimum writable unit of the memory unit.

Wherein the method includes: the control unit receives a set of target data and a writing instruction from a host. In which, the writing instruction has a target logical address and a target data length corresponding to the set of target data. Next, the control unit determines whether the set of target data is a set of small data according to the target data length (usually, the small data will be updated or renewed frequently). If the determining result is positive, the control unit then writes the set of target data into the physical memory block which already stores at least one set of small data. By doing this, the invalid physical memory pages, which is generated because of data updating, will locate collectively in some of the physical memory blocks.

And the present invention invites another method for writing data into a flash memory. Similarly, the flash memory includes a control unit and a memory unit. The flash memory is separated into several physical memory blocks, and the physical memory block is further separated into a plurality of physical memory pages.

The control unit receives a set of target data and a writing instruction from a host. The writing instruction comprises a target logical address and a target data length corresponding to the set of target data. Next, the control unit determines whether there the set of target data has a part of not-aligned target data, according to the relation recorded in a logical/physical address mapping table, the target data length, and the storage size of a physical memory page. If the part of not-aligned target data does exist, the control unit then writes the part of not-aligned target data into the physical memory block which already stores at least a set of not-aligned data. Consequently, the invalid physical memory pages, which generated because of the not-aligned data, will collectively locate in some of the physical memory blocks.

Moreover, still another method for writing data into flash memory is disclosed. The method includes: after the control unit receives a set of target data and a writing instruction, the control unit then determines whether the set of target data is small data (which is frequently updated). If the set of target data is small, the set of target data is collectively stored into the memory unit with other small data.

If the set of target data is not a small data, the control unit then further determines whether the set of target data has a part of not-aligned target data according to the relation between logical addresses and physical addresses, the target data length, and the storage size of a physical memory page. If the part of not-aligned target data does exist, the part of not-aligned target data is then stored into the physical memory block which already stores at least a set of not-aligned data. Specifically, the small data and the not-aligned data can be collectively stored into the physical memory blocks.

Therefore, according to the present invention, the invalid physical memory pages will be generated in some specific memory blocks, in order to improve the storage releasing efficiency of garbage collection process.

For further understanding of the invention, reference is made to the following detailed description illustrating the embodiments and examples of the invention. The description is only for illustrating the invention, not for limiting the scope of the claim.

BRIEF DESCRIPTION OF THE DRAWINGS

The drawings included herein provide further understanding of the invention. A brief introduction of the drawings is as follows:

FIGS. 12-1 and 12-2 are flow charts of another embodiment of method for writing data into flash memory according to the present invention.

DETAILED DESCRIPTION OF THE PREFERRED EMBODIMENTS

The present invention discloses methods for writing data into flash memory, in order to improve the efficiency of the garbage collection.

Figure 6:
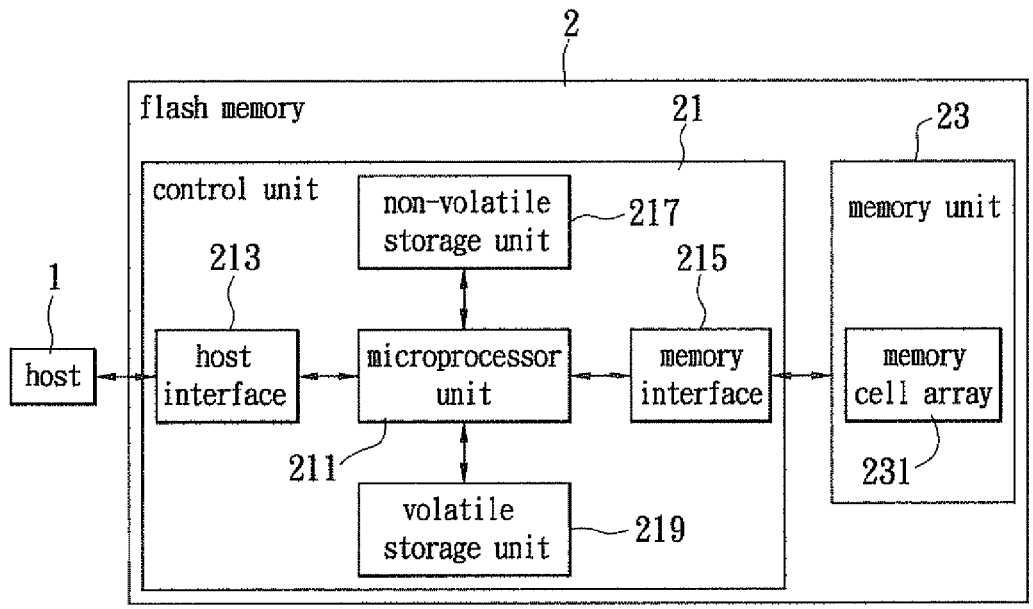
FIG. 6 is a hardware block diagram of an embodiment of a flash memory according to the present invention.

Please refer to FIG. 6, which is a hardware block diagram of an embodiment of a flash memory 2. The flash memory 2 includes a control unit 21 and a memory unit 23. In which the control unit 21 further has a microprocessor unit 211, a host interface 213, a memory interface 215, a non-volatile storage unit 217, and a volatile storage unit 219. The memory unit 23 has memory cell arrays 231, which are divided into several physical memory blocks. And the physical memory block is further separated into a plurality of physical memory pages. In which, the physical memory block is the minimum erasable unit of the memory unit 23, and the physical memory page is the minimum writable unit of the memory unit 23.

The control unit 21 transmits and receives data and instructions with a host 1 through the host interface 213. On the other hand, the control unit 21 transmits and receives data and signals with the memory unit 23 through the memory interface 215. The non-volatile storage unit 217, such as a read only memory (ROM), is for storing the relative codes for managing the memory unit 23. Wherein the microprocessor unit 211 is for managing and controlling the memory unit 23 according to the codes stored in the non-volatile storage unit 217 and the data and instructions transmitted from the host 1.

Additionally, the volatile storage unit 219, such as a random access memory (RAM), can be either disposed inside the control unit 21 or outside the control unit 21. Wherein the storage unit 219 is for temporarily storing the relative information (such as a logical/physical address mapping table, data allocation table, and other information) for managing the memory unit 23, or storing the accessed data between the control unit 21 and the memory unit 23.

Figure 7:
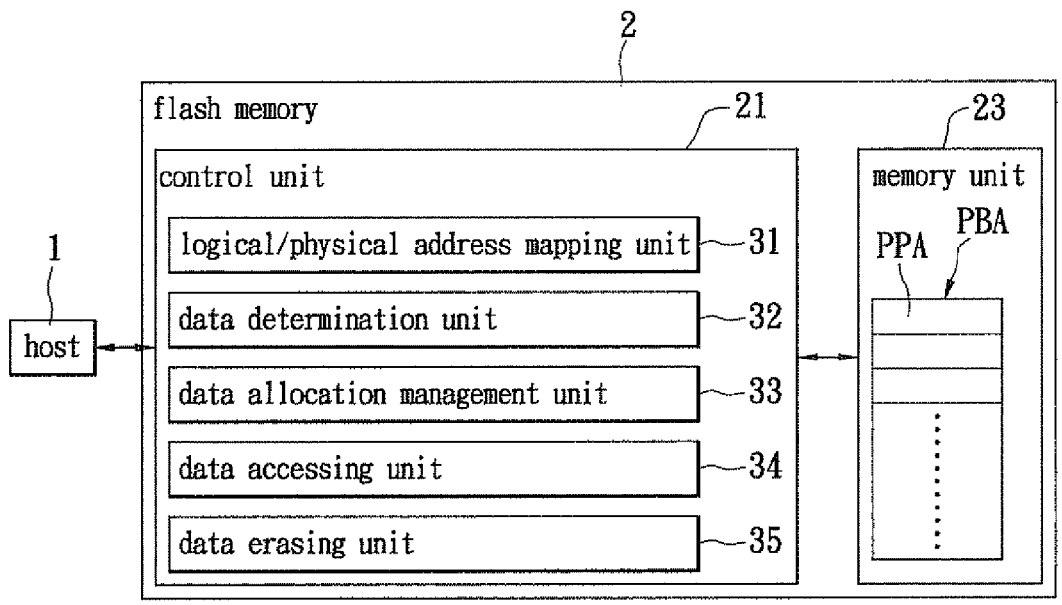
FIG. 7 is a functional block diagram of an embodiment of a flash memory according to the present invention.

Please refer to FIG. 7, which is a function block diagram of an embodiment of the flash memory. As shown in FIG. 7, the control unit 21 includes a logical/physical address mapping unit 31, a data determination unit 32, a data allocation management unit 33, a data accessing unit 34, and a data erasing unit 35.

In which, the logical/physical address mapping unit 31 is for mapping the logical address transmitted from the host 1 to the corresponding physical address of the memory unit 23. The relation between the logical addresses and the physical addresses is recorded in a logical/physical address mapping table. Additionally, the data determination unit 32 is for identifying the length of data, and for recognizing the logical/physical mapping relation of the data to be stored.

The data allocation management unit 33 is for managing the allocation information of the data stored in the memory unit 23. The data allocation management unit 33 establishes and manages a block information table for recording the status of the physical memory pages, such as free, valid, or invalid. And the block information table further records the amount of invalid physical memory pages in every physical memory block. Therefore, the control unit 21 can find the physical memory block which has the most invalid physical memory page according to the block information table, in order to implement the garbage collection.

Additionally, the data accessing unit 34 is for accessing the data stored in the memory unit 23. And the data erasing unit 35 is for erasing the data stored in physical memory blocks.

Please refer to FIG. 7 corresponding with FIG. 6. After the control unit 21 receives the writing instruction and the set of target data from the host 1 through the host interface 213, the set of target data is temporarily stored in the volatile storage unit 219. In which the writing instruction include a target logical address and a target data length corresponding to the set of target data. The target logical address is then converted into corresponding physical address by the logical/physical address mapping unit 31.

The data determination unit 32 is for identifying the data length and determining the alignment condition of the set of target data according to the target data length of the received writing instruction. And then the data accessing unit 34 stores the set of target data into the memory unit 23 through the memory interface 215, according to the determination result of the data determination unit 32 and the information recorded in the data allocation management unit 33.

As more and more data storing into the memory unit 23, the usable storage in the memory unit 23 decreases. The control unit 21 will do garbage collection when the usable storage decreases to a predetermined value, in order to release the occupied memory space.

The control unit 21 uses data allocation management unit 33, data accessing unit 34, and data erasing unit 35 to do the garbage collection. Data allocation management unit 33 chooses out the physical memory block which has the most invalid physical memory pages for implementing the garbage collection process. According to the present invention, the small data and the not-aligned data are collectively stored into some physical memory blocks. Thus, the invalid physical memory pages will be generated in some specific physical memory blocks.

Generally, the small data is frequently updated. So by recognizing the data length, the control unit 21 can determines whether the set of target data is a frequently-updated data. After that, the control unit 21 then stores the small data separately from the large data.

For further explanation, the data determination unit 32 of control unit 21 can set a threshold value of the data length. If the target data length is smaller or equals to the threshold value, the set of target data is then determined as a small data. In a preferred embodiment, the threshold value of data length can be 4 KB.

Figure 8A:
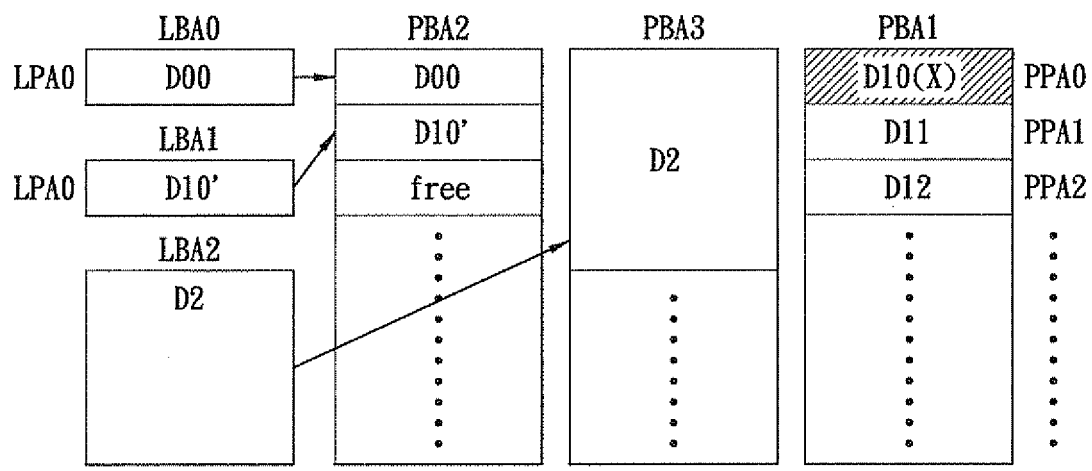
FIG. 8A and FIG. 8B are schematic diagrams of an embodiment of data writing method according to the present invention.

Please refer to FIG. 8A, which is a schematic diagram of an embodiment for processing data. The control unit 21 receives an instruction from a host 1. In which the instruction indicates that a set of writing data D00 is going to be stored in logical memory page LPA0 of logical memory block LBA0. And the instruction further shows that a set of updating data D10' is going to update the data D10 which is stored in the logical memory page LPA0 of the logical memory block LBA1. Wherein the logical memory page LPA0 of logical memory block LBA1 is originally mapped to the physical memory page PPA0 of physical memory block PBA1. Additionally, the writing data D00 and the updating data D10' are both smaller than the threshold value of data length.

The logical address of the data D00 is firstly mapped to physical address. That is, the control unit 21 can select an erased physical memory block, such as physical memory block PBA2, to store the data D00 which has the data length smaller than the threshold value. Thus, the data D00 is then stored into the physical memory page PPA0 of the physical memory block PBA2. And the relation between logical memory page LPA0 of logical memory block LBA0 and the physical memory page PPA0 of physical memory block PBA2 is further recorded in the logical/physical address mapping table. Additionally, the physical memory block PBA2 is then used as the currently writing memory block for storing new data which is smaller than the threshold value.

On the other hand, the updating data D10' also has the data length smaller than the threshold value. So the updating data D10' is then allocated into the physical memory page PPA1 of the physical memory block PBA2 (which is currently used to store small data). Similarly, the relation between the logical memory page LPA0 of the logical memory block LBA1 and the physical memory page PPA1 of the physical memory block PBA2 is established. Next, the physical memory page PPA0 of physical memory block PBA1 is then marked as an invalid memory page, for completing the data update.

Then the control unit 21 receives a set of target data D2 which is going to be stored into the logical memory block LBA2. In which, the target data D2 has the data length larger than the threshold value. Because the target data D2 is a set of large data, the control unit 21 selects another erased physical memory block (PBA3 in this embodiment) rather than physical memory block PBA2 to store the target data D2. By doing this, the small data and the large data are separately stored into different physical memory blocks.

Figure 8B:
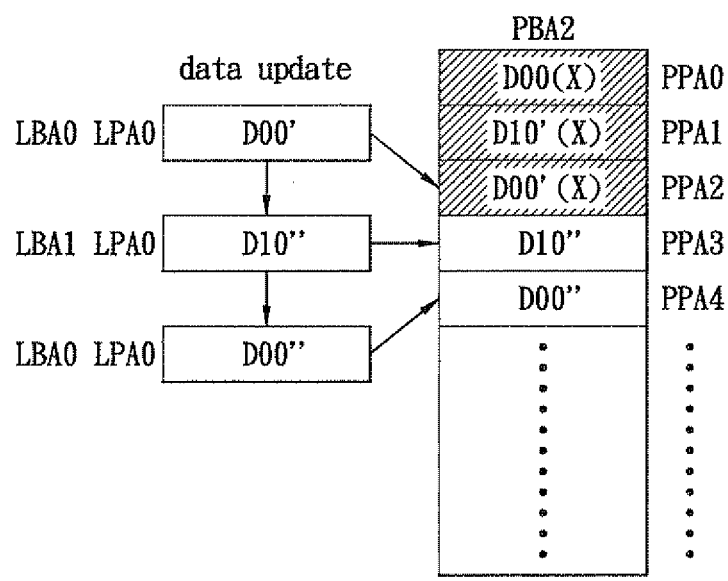

Please refer to FIG. 8B, which is a schematic diagram of another embodiment of processing data into the flash memory. Corresponding to FIG. 8A, the control unit 21 then receives a set of updating data D00' which is going to update the data in logical memory page LPA0 of logical memory block LBA0. And the control unit 21 stores the updating data D00' into the physical memory page PPA2 of the physical memory block PBA2. After that, the control unit 21 maps the logical memory page LPA0 of the logical memory block LBA0 to the physical memory page PPA2 of the physical memory block PBA2, and marks the physical memory page PPA0 of physical memory block PBA0 as an invalid memory page.

Additionally, if the control unit 21 further receives a set of updating data D10" which is similarly going to update the data stored in the logical memory page LPA0 of logical memory block LBA1, the control unit 21 then writes the data D10" into the physical memory page PPA3 of the physical memory block PBA2. And the relation recorded in the logical/physical address mapping table is updated correspondingly. Then the physical memory page PPA1 of the physical memory block PBA2 which stores the data D10' is marked as invalid memory page.

Moreover, the control unit 21 receives a set of updating data D00" which is going to update the data stored in the logical memory page LP0 of logical memory block LBA0. The control unit 21 then stores the data D00" into the physical memory page PPA4 of physical memory block PBA2, updates the relation recorded in the mapping table, and marks the physical memory page PPA2 of physical memory block PBA2 as an invalid memory page.

The physical memory block PBA2 is for storing small data. After several data writing and updating processes, the invalid physical memory pages because of data updating are collectively generated in the physical memory block PBA2 by performing the method according the present invention. For example, the physical memory page PPA0, PPA1 and PPA2 are marked invalid as shown in FIG. 8B.

Therefore, when the garbage collection process is started, the control unit 21 can easily find the physical memory block which has the most invalid physical memory pages by searching the block information table. In which, the block information table records the amount of invalid memory pages of every physical memory block.

Figure 8C:
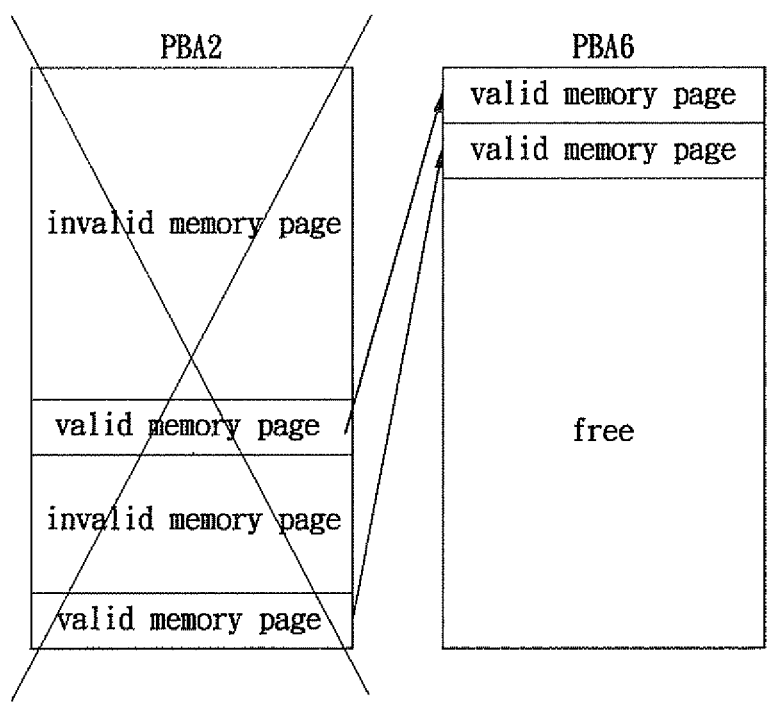
FIG. 8C is a schematic diagram of an embodiment of doing garbage collection according to the present invention.

Please refer to FIG. 8C, which is a schematic diagram of the garbage collection process. Corresponding to FIGS. 8A and 8C, when the control unit 21 starts garbage collection, the invalid memory pages in the physical memory block PBA2 is more than the invalid memory pages in the physical memory block PBA3. So by searching the block information table, the control unit 21 can easily find the physical memory block, like physical memory block PBA2, to perform the garbage collection process.

Next, the control unit 21 selects an erased physical memory block, such as physical memory block PBA6, to store the valid data in the physical memory block PBA2. Because there are few valid data in the physical memory block PBA2 will be copied into physical memory block PBA5, so the amount of releasing physical memory pages are relatively more than prior art.

Figure 9:
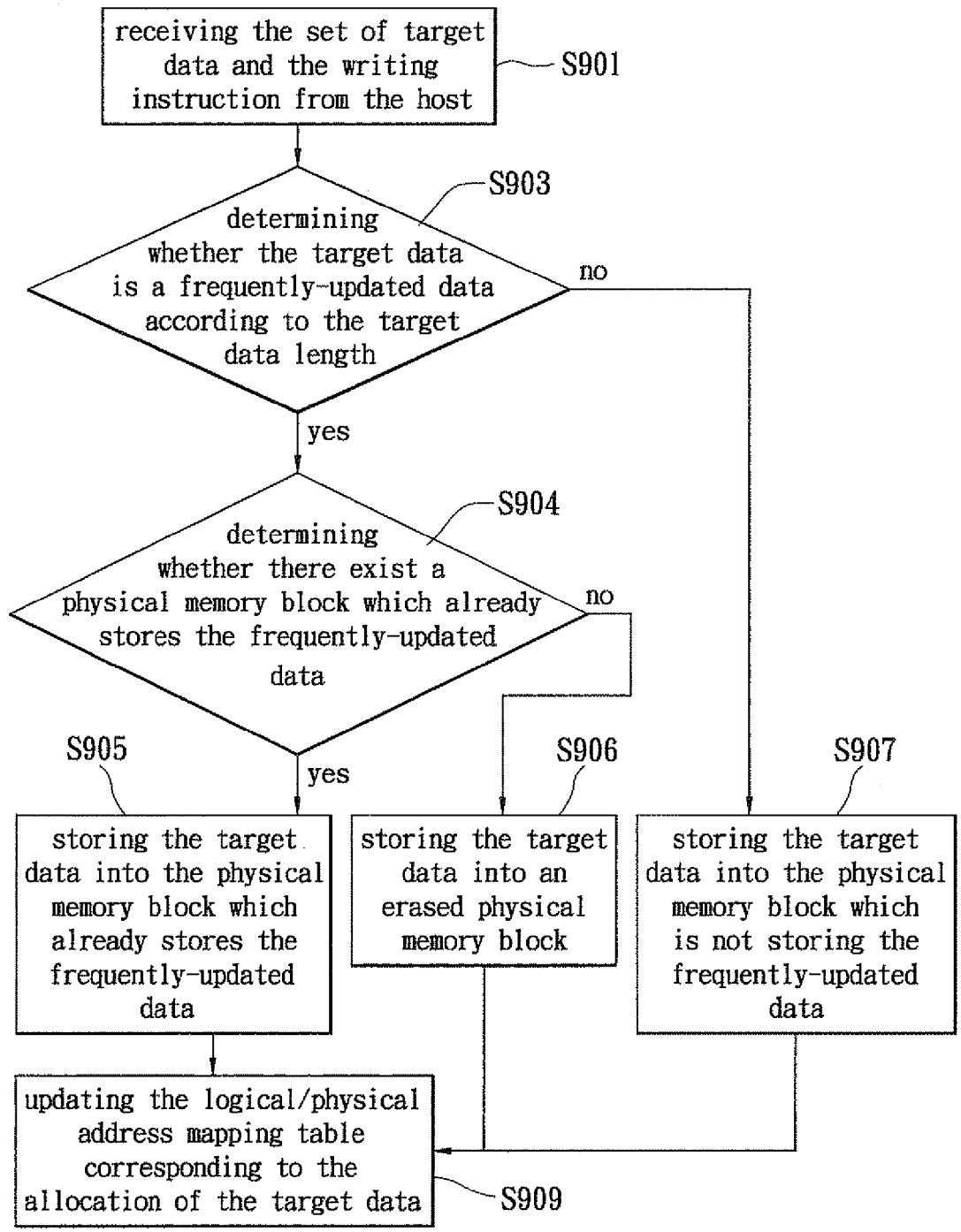
FIG. 9 is a flow chart of an embodiment of the method for writing data into flash memory according to the present invention.

Please refer to FIG. 9, which is a flow chart of an embodiment of method for writing data into flash memory. At the beginning, the control unit 21 receives a set of target data and a writing instruction form a host 1 (S901). In which, the writing instruction includes a target logical address and a target data length corresponding to the set of target data. Then, the control unit 21 determines whether the set of target data is frequently updated according to the target data length (S903).

If the determination result is positive, the control unit 21 further determines whether there exists the physical memory block which already stores frequently-updated data (S904). If the physical memory block which already stores frequently-updated data does exist, the control unit 21 then stores the set of target data into the physical memory block which already stores frequently-updated data (S905). After that, the relation recorded in the logical/physical address mapping table is updated correspondingly (S909). If there is no physical memory block which already stores frequently-updated data, the control unit 21 then stores the set of target data into an erased physical memory block (S906). And the relation recorded in the logical/physical address mapping table is updated correspondingly (S909).

If the determination result shows that the set of target data is not going to be frequently updated, the control unit 21 then stores the target data into the physical memory block which is not storing the frequently-updated data. In which, the physical memory block which is not storing the frequently-updated data can be an erased physical memory block or the physical memory block which already stores not-frequently-updated data (S907). And the logical/physical address mapping table is updated correspondingly (S909).

Figure 10A:
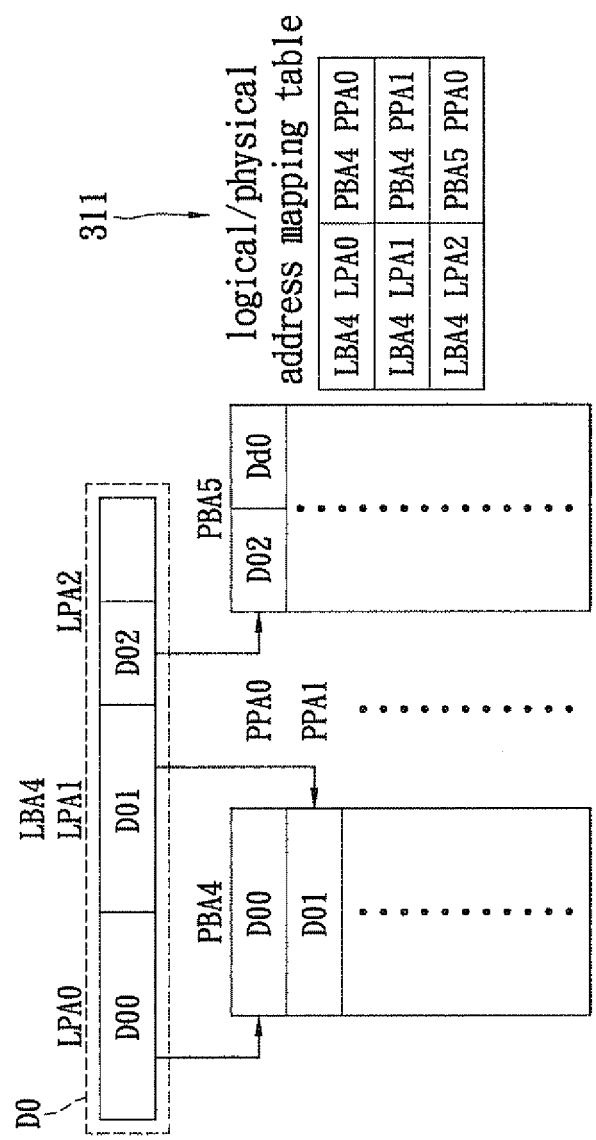
FIG. 10A and FIG. 10B are schematic diagrams of an embodiment of data allocating method according to the present invention.

Please refer to FIG. 10A, which is an embodiment of data processing. The control unit 21 receives a set of target data D0 which has data D00, D01, and D02. In which the data D00, D01, and D02 is going to be stored respectively into the logical memory pages LPA0, LPA1, and LPA2 of logical memory block LBA4. After conversion of the address and the determination of target data length, the control unit 21 recognizes that the data D00 and D01 can fill the physical memory page to the full (aligned data). And on the contrary, the data D02 cannot fill the physical memory page (not-aligned data).

The control unit 21 selects the physical memory block PBA4 to store the part of aligned target data D00 and D01. Thus, the data D00 and D01 are stored respectively into the physical memory pages PPA0 and PPA1 of the physical memory block PBA4. Then, the control unit 21 selects another physical memory block PBA5 rather than physical memory block PBA4 to store the not-aligned target data D02. Wherein the data D02 is stored in the physical memory page PPA0 of the physical memory block PBA5.

The remaining storage in the physical memory page PPA0 of physical memory block PBA5, which is not occupied by the data D02, is then filled with the old data Dd0 which is previously stored in the physical memory page PPA0 of physical memory block PBA5 (or filled with a dummy data generated by the control unit 21). In which the data D02 plus the old data Dd0 can fill the physical memory PPA0 of the physical memory block PBA5. At last, the control unit 21 updated the relation between the logical address and the physical address recorded in the logical/physical address mapping table 311 correspondingly, as shown in FIG. 10A.

Figure 10B:
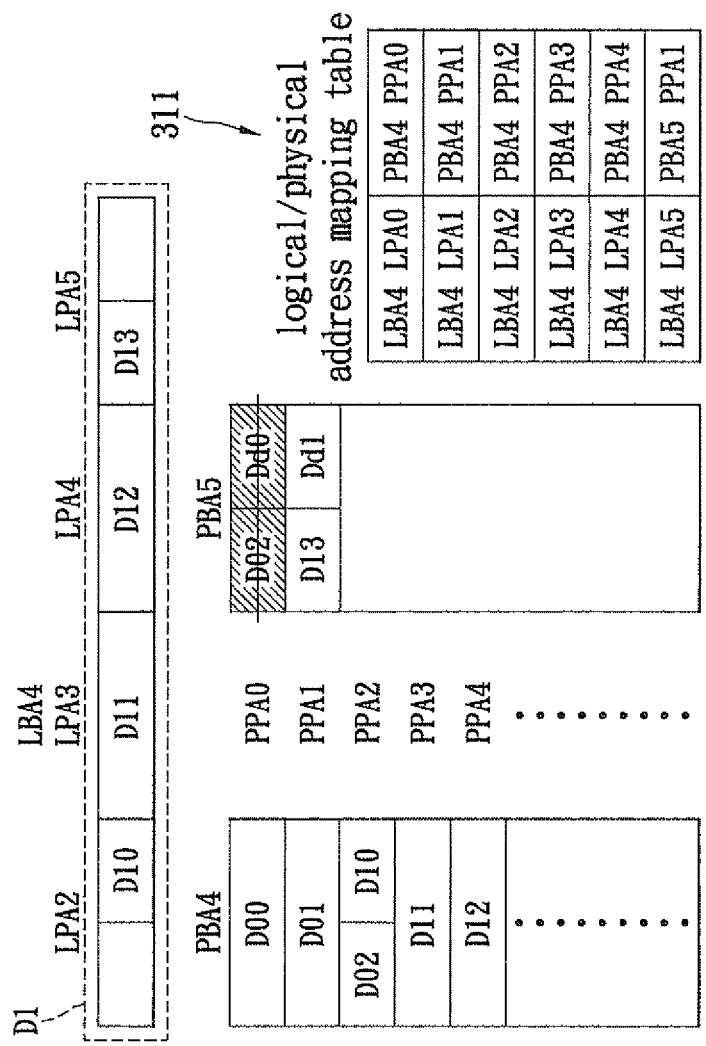

Next, please refer to FIG. 10B, which is a schematic diagram of an embodiment of processing data in the flash memory. Corresponding to FIG. 10A, the control unit 21 then receives a set of target data D1 which has data D10, D11, D12, and D13 from the host 1. In which, the target logical address of the set of target data D1 is right after the logical address of data D0. That is, the data D10, D11, D12, and D13 are going to be stored respectively into the logical memory pages LPA2, LPA3, LPA4, and LPA5 of the logical memory block LBA4.

After the control unit 21 determines the length and addresses of the set of target data D1, the previously stored data D02 is then read and combined with data D10. And the combined data is continuously stored into the physical memory block LBA4. Additionally, the physical memory page PPA0 of the physical memory block PBA5 is marked as an invalid memory page.

Please refer to FIG. 10B again. The data D11 and D12 are respectively written into the physical memory pages PPA3 and PPA4 of the physical memory block PBA4. Next, because the data length of data D13 is not large enough to fill a physical memory page to the full, so the control unit 21 stores the data D13 into the physical memory page PPA1 of the physical memory block PBA5. Wherein the remaining storage of the physical memory page PPA1 of the physical memory block PBA5 is filled with the old data Dd1 which is previously stored in the physical memory page PPA1 of the physical memory block PBA5 (or filled with a dummy data generated by the control unit 21). At last, the logical/physical address mapping table 311 is then updated correspondingly.

As shown in FIG. 10B, by allocating the not-aligned data collectively in the physical memory block PBA5, the invalid memory pages which are generated because of successive data storing can be gathered together. Therefore, the efficiency of storage releasing of garbage collection process may be increased.

Moreover, the physical memory blocks which are used to store not-aligned data (such as PBA5 shown in FIGS. 10A and 10B) and the physical memory blocks which are used to store the frequently-updated data (such as PBA2 shown in FIGS. 8A and 8B) can be the same physical memory blocks. That is, the frequently-updated data (small data) and the not-aligned data are collectively stored together, in order to further increase the efficiency of garbage collection.

Figure 11:
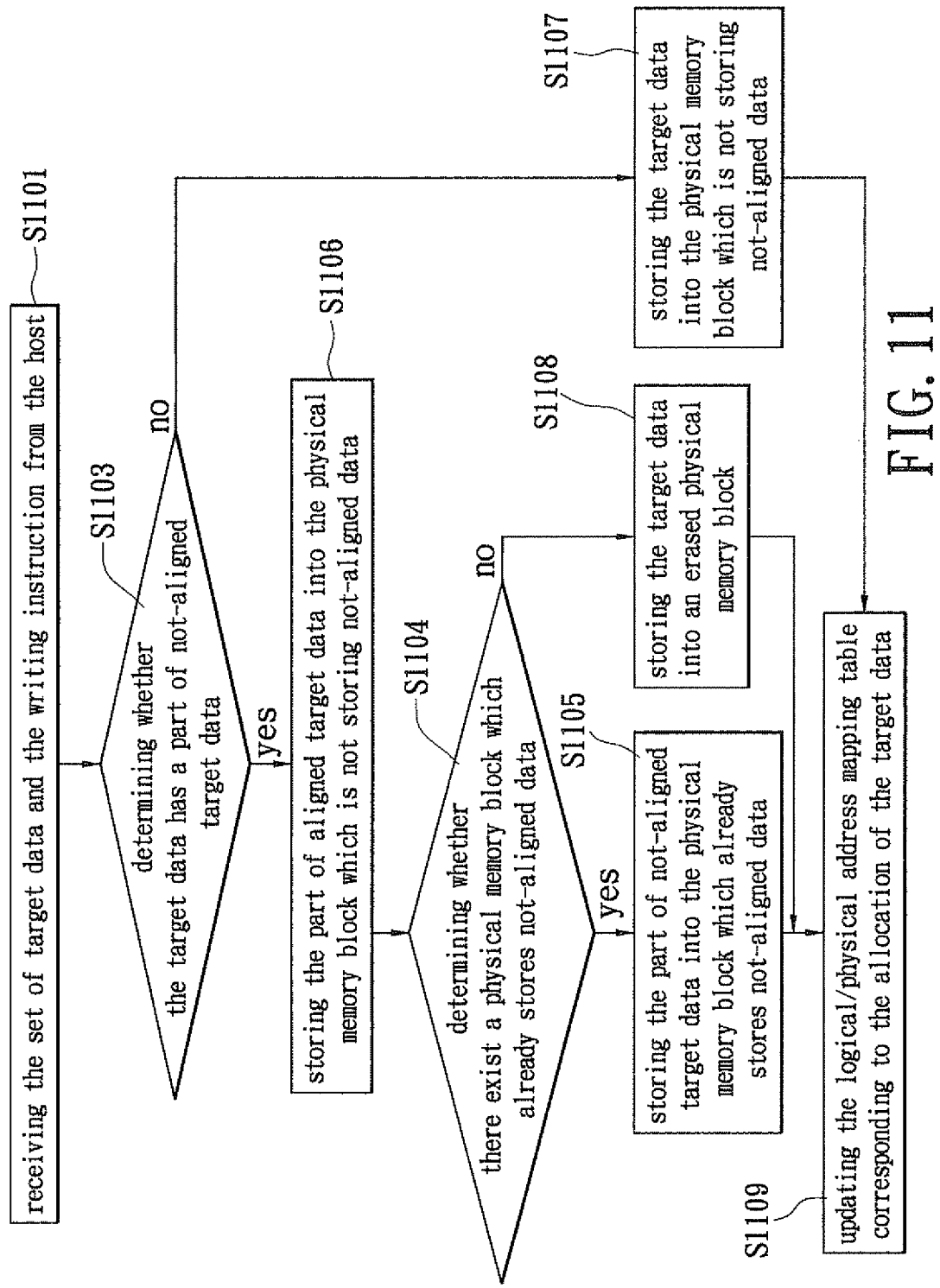
FIG. 11 is a flow chart of an embodiment of method for writing data into flash memory according to the present invention.

Please refer to FIG. 11, which is a flow chart of an embodiment of method for writing data into flash memory. The method includes: the control unit 21 receiving the set of target data and the writing instruction from the host 1 (S1101). In which the writing instruction includes a target data length and a target logical address corresponding to the set of target data. Next, the control unit 21 determines whether the set of target data has a part of not-aligned target data according to the relation recorded in the logical/physical address mapping table 311, the target logical address, and the target data length (S1103).

If the determination shows that the part of not-aligned target data exists, the control unit 21 then stores the aligned part of target data into the physical memory block which is not for storing not-aligned data (S1106). After that, the control unit 21 further determines whether there exists the physical memory block which already stores not-aligned data (S1104). If there is the physical memory block which already stores not-aligned data, the control unit 21 then stores the part of not-aligned target data into the physical memory block which already stores not-aligned data (S1105). On the contrary, if there is no physical memory block which already stores not-aligned data, the control unit 21 then selects an erased physical memory block to store the not-aligned target data (S1108). Next, the relation between logical addresses and physical addresses recorded in the logical/physical address mapping table 311 is updated correspondingly (S1109).

If the set of target data doesn't have the part of not-aligned target data, the set of target data is then stored into the physical memory block which did not store any not-aligned data (S1107). In which the physical memory block which did not store any not-aligned data can be an erased physical memory block or a physical memory block which already stores at least a set of aligned data. At last, the relation between logical addresses and physical addresses recorded in the logical/physical address mapping table 311 is updated correspondingly (S1109).

Figure 1:
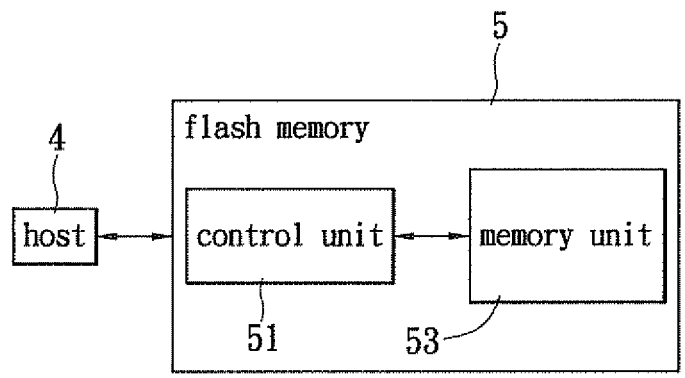
FIG. 1 is a block diagram of the conventional flash memory system.
Figure 2:
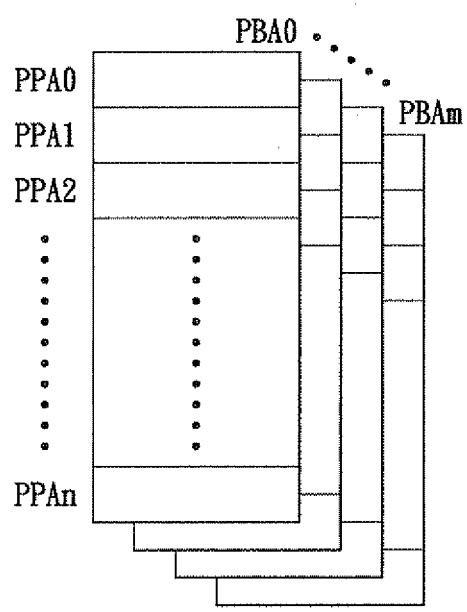
FIG. 2 is a schematic diagram of the storage separation of a memory unit.
Figures 3, 4:
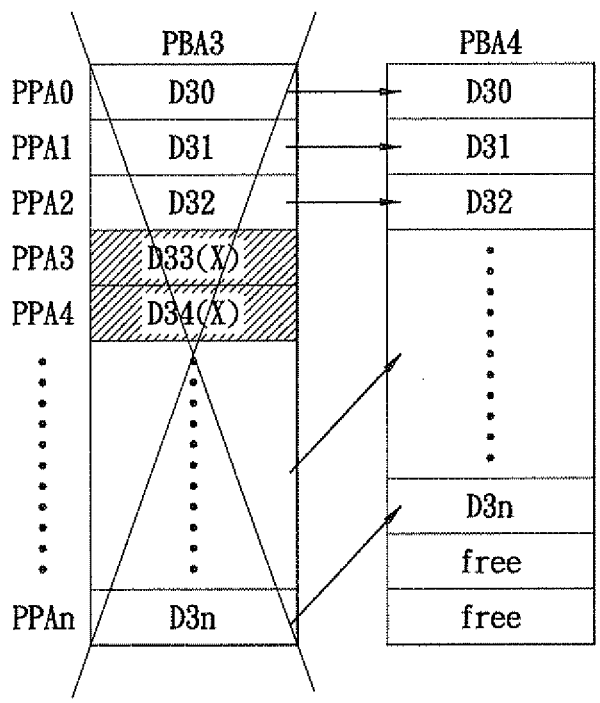
FIG. 3 is a schematic diagram of the conventional data updating operation.
FIG. 4 is a schematic diagram of the garbage collection process.
Figure 5A:
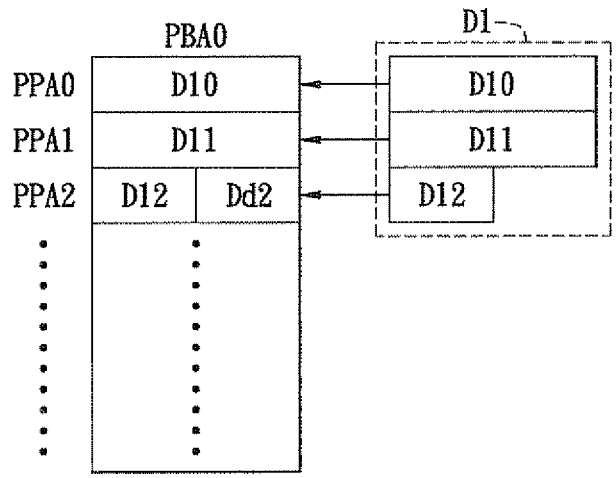
FIG. 5A and FIG. 5B are schematic diagrams of the conventional data writing operation.
Figure 5B:
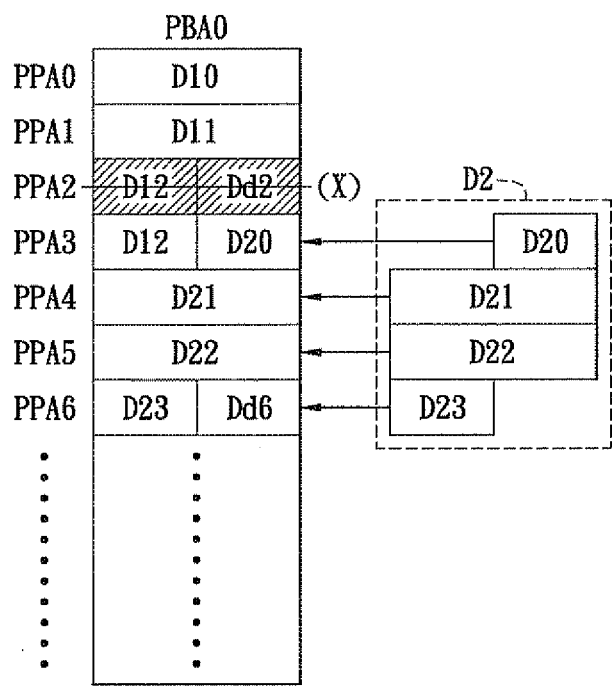
Figures 1, 12:
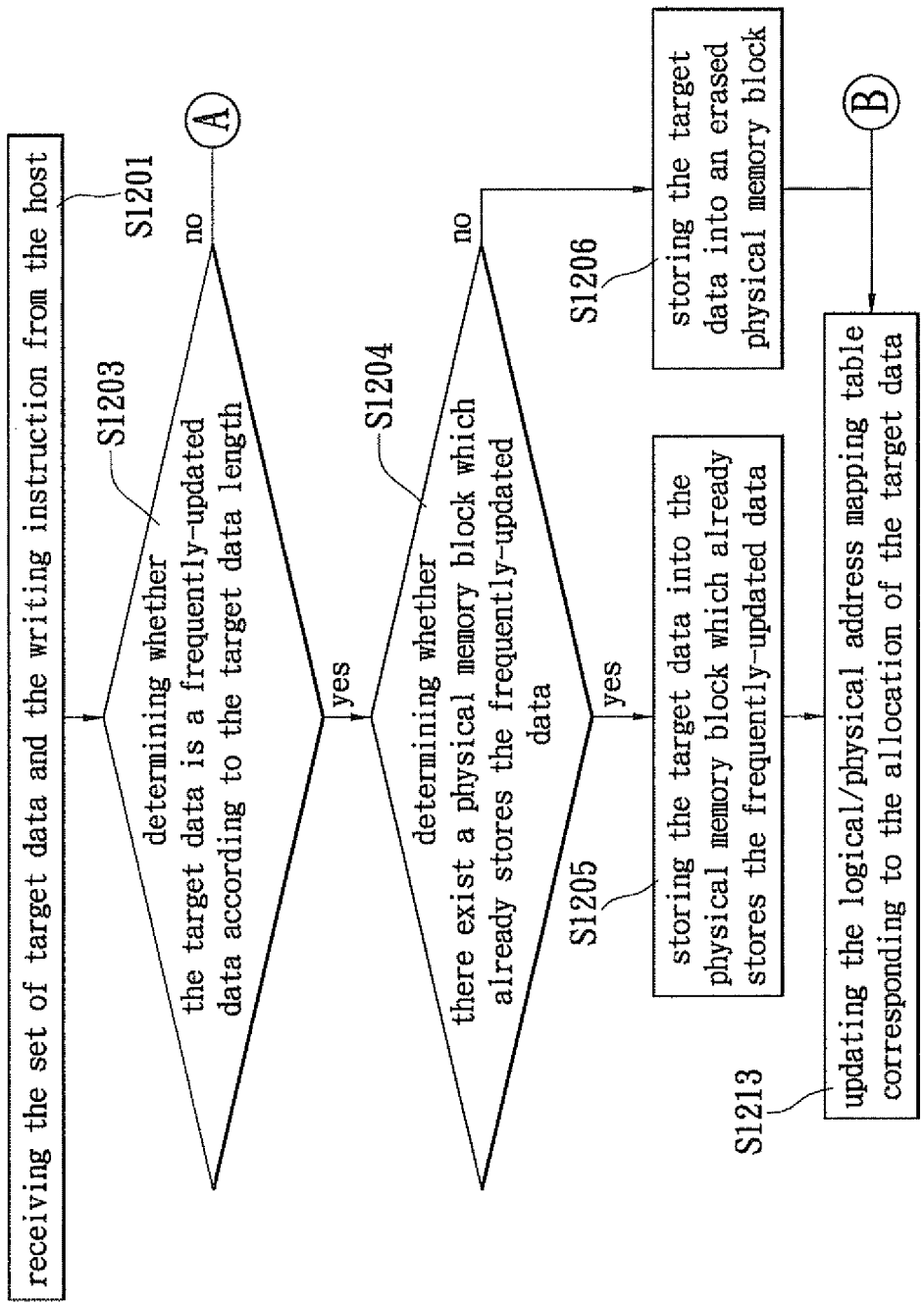
Figures 2, 12:
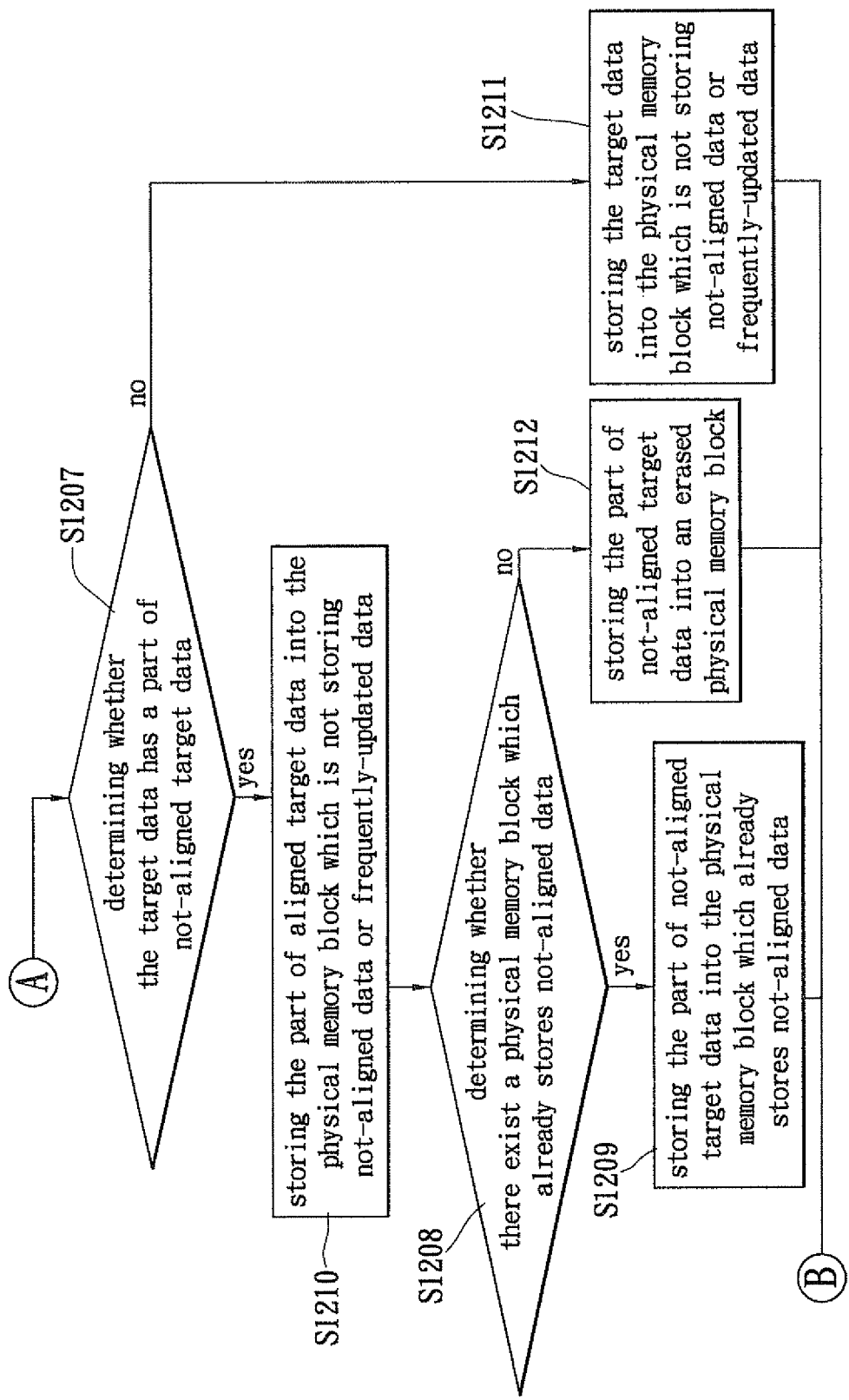

Please refer to FIGS. 12-1 and 12-2, which are flow charts of another embodiment of method for writing data into flash memory. Firstly, the control unit 21 receives the set of target data and the writing instruction from the host 1 (S1201). Then the control unit 21 determines whether the target data is a frequently-updated data according to the target data length (S1203). If the determination result is positive, the control unit 21 then further determines whether there is the physical memory block which already stores at least a set of frequently-updated data (S1204). If the physical memory block which already stores at least a set of frequently-updated data does exist, the target data is then stored into the physical memory block which already stores at least a set of frequently-updated data (S1205). On the other hand, if there is no physical memory block which already stores at least a set of frequently-updated data, the control unit 21 then stores the target data into an erased physical memory block (S1206).

And if the set of target data is determined as a not-frequently-updated (such as a set of large data), the control unit 21 then further determines whether the set of target data has a part of not-aligned target data according to the relation recorded in the logical/physical address mapping table 311, the target logical address, and the target data length (S1207).

If the part of not-aligned target data exists, the control unit 21 then stores the aligned part of the target data into the physical memory block which is not storing the frequently-updated data or the not-aligned data (S1210). After that, the control unit 21 further determines whether the memory unit 23 has a physical memory block which already stores the not-aligned data (S1208). If the memory unit 23 does has the physical memory block which already stores the not-aligned data, the part of not-aligned target data is then stored into the physical memory block which already stores the not-aligned data (S1209). On the contrary, if the memory unit 23 does not have the physical memory block which already stores the not-aligned data, the part of not-aligned target data is stored into an erased physical memory block (S1212).

Furthermore, if the set of target data does not have the part of not-aligned target data, then the set of target data is stored into a physical memory block which already stores at least a set of aligned data or an erased physical memory block (S1211). Finally, the control unit 21 updates the relation between logical addresses and physical addresses recorded in the logical/physical address mapping table 311 is updated corresponding to the allocation of the set of target data (S1213).

Specifically, the frequently-updated data and the not-aligned data can be stored together in the same physical memory block. By doing this, the garbage collection efficiency can be further increased.

As disclosed above, the frequently-updated data and the not-aligned data are stored together in some specific physical memory blocks according to the present invention. Thus, the invalid physical memory pages can be generated collectively, in order to improve the storage releasing efficiency of garbage collection.

Some modifications of these examples, as well as other possibilities will, on reading or having read this description, or having comprehended these examples, will occur to those skilled in the art. Such modifications and variations are comprehended within this invention as described here and claimed below. The description above illustrates only a relative few specific embodiments and examples of the invention. The invention, indeed, does include various modifications and variations made to the structures and operations described herein, which still fall within the scope of the invention as defined in the following claims.

What is claimed is:

1. A method for writing data into flash memory, the flash memory including a control unit and a memory unit, in which the memory unit has a plurality of physical memory blocks, wherein the physical memory block includes a plurality of physical memory pages, and the control unit has a logical/physical address mapping table which is for recording a relation between logical addresses and physical addresses, the method comprising:

receiving a writing instruction and a set of target data from a host by the control unit, in which the writing instruction includes a target logical address and a target data length corresponding to the set of target data;

comparing the target data length with a threshold value by the control unit;

when the target data length equals to or is smaller than the threshold value, the set of target data is determined to be a frequently-updated data and then stored into a first physical memory block;

when the target data length is larger than the threshold value, determining whether the set of target data has a part of not-aligned target data which is not aligned to the physical memory page; and when the set of target data has the part of not-aligned target data, the part of not-aligned target data is then stored into a third physical memory block, and a part of aligned target data is then stored into a second physical memory block;

wherein when the target data length is not an integral multiple of a storage size of one physical memory page, the target data has the part of not-aligned target data, and the part of not-aligned target data are data not filling one physical memory page to the full, and the part of aligned data are data filling at least one physical memory page to the full.

2. The method as in claim 1, wherein the first physical memory block and the third physical memory block are the same physical memory block in the memory unit.

3. The method as in claim 2, wherein the first physical memory block and the third physical memory block is the physical memory block which already stores at least a set of small data, or the physical memory block which already stores at least a set of not-aligned data; in which data length of the set of small data equals to or is smaller than the threshold value, and the set of not-aligned data is not aligned to the physical memory page.

4. The method as in claim 1, wherein the first physical memory block and the third physical memory block are respectively erased physical memory blocks.

5. The method as in claim 1, wherein the second physical memory block is an erased physical memory block or the physical memory block which already stores a set of aligned data.

6. The method as in claim 1, further comprising:

updating the relation between logical addresses and physical addresses recorded in the logical/physical address mapping table according to the allocation of the set of target data.

7. The method as in claim 1, wherein the threshold value equals to the storage size of the physical memory page.

* * * * *